United States Patent
Matsumura et al.

(10) Patent No.: US 11,184,205 B2
(45) Date of Patent: Nov. 23, 2021

(54) RECEPTION APPARATUS AND TRANSMISSION APPARATUS

(71) Applicant: NTT DOCOMO, INC., Tokyo (JP)

(72) Inventors: Yuki Matsumura, Tokyo (JP); Satoshi Nagata, Tokyo (JP); Xin Wang, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/054,020

(22) PCT Filed: May 10, 2018

(86) PCT No.: PCT/JP2018/018135
§ 371 (c)(1),
(2) Date: Nov. 9, 2020

(87) PCT Pub. No.: WO2019/215874
PCT Pub. Date: Nov. 14, 2019

(65) Prior Publication Data
US 2021/0234739 A1    Jul. 29, 2021

(51) Int. Cl.
*H04L 27/26* (2006.01)
*H04B 17/345* (2015.01)

(52) U.S. Cl.
CPC ........... *H04L 27/26* (2013.01); *H04B 17/345* (2015.01)

(58) Field of Classification Search
CPC ......... H04L 27/00; H04L 27/26; H04L 27/38; H04L 27/40; H04L 27/49; H04L 27/497; H04L 27/4975; H04B 17/345
See application file for complete search history.

(56) References Cited

U.S. PATENT DOCUMENTS

| | | | | |
|---|---|---|---|---|
| 8,451,944 B2* | 5/2013 | Gaur | ............. | H04B 7/0452 375/296 |
| 8,711,975 B2* | 4/2014 | Gaur | ............. | H04B 7/0426 375/296 |
| 8,861,356 B2* | 10/2014 | Kozat | ............. | H04L 47/10 370/235 |
| 8,897,122 B2* | 11/2014 | Nakano | ............. | H04B 7/0658 370/203 |
| 9,826,537 B2* | 11/2017 | Forenza | ............. | H04B 17/318 |
| 9,979,516 B2* | 5/2018 | Onodera | ............. | H04W 16/28 |
| 10,516,437 B2* | 12/2019 | Wang | ............. | H04B 7/0456 |

(Continued)

FOREIGN PATENT DOCUMENTS

JP    2011-233944 A    11/2011

OTHER PUBLICATIONS

International Search Report issued in PCT/JP2018/018135 dated Jul. 24, 2018 (2 pages).

(Continued)

*Primary Examiner* — James M Perez
(74) *Attorney, Agent, or Firm* — Osha Bergman Watanabe & Burton LLP

(57) ABSTRACT

A receiving apparatus includes a receiving section that receives a data signal, a demodulation reference signal, and a specific signal in at least one of a plurality of layers, and a control section that, based on the demodulation reference signal and the specific signal, estimates interference, controls transmission of a result of the estimation, and performs a modulo operation of the data signal.

10 Claims, 13 Drawing Sheets

(56) References Cited

U.S. PATENT DOCUMENTS

| | | | |
|---|---|---|---|
| 10,594,520 B2* | 3/2020 | Chiskis | H04B 3/32 |
| 10,743,298 B2* | 8/2020 | Yasukawa | H04W 48/12 |
| 11,129,200 B2* | 9/2021 | Takeda | H04W 16/28 |
| 2010/0208837 A1* | 8/2010 | Vetter | H04L 27/2602 |
| | | | 375/267 |
| 2012/0064833 A1* | 3/2012 | Nakano | H04L 25/03343 |
| | | | 455/63.1 |
| 2012/0294240 A1* | 11/2012 | Nakano | H04J 11/0033 |
| | | | 370/328 |
| 2012/0307706 A1* | 12/2012 | Nakano | H04L 25/03343 |
| | | | 370/312 |
| 2012/0327881 A1* | 12/2012 | Nakano | H04B 7/0452 |
| | | | 370/329 |
| 2013/0003641 A1* | 1/2013 | Nakano | H04B 7/0452 |
| | | | 370/312 |
| 2013/0064150 A1* | 3/2013 | Hirata | H04B 7/0452 |
| | | | 370/310 |
| 2013/0223269 A1* | 8/2013 | To | H04L 25/03942 |
| | | | 370/252 |
| 2013/0243109 A1* | 9/2013 | Gaur | H04B 7/0456 |
| | | | 375/267 |
| 2013/0336282 A1* | 12/2013 | Nakano | H04L 25/067 |
| | | | 370/330 |
| 2014/0064354 A1* | 3/2014 | Nakano | H04J 11/00 |
| | | | 375/233 |
| 2014/0204841 A1* | 7/2014 | Ruiz Delgado | H04B 7/0456 |
| | | | 370/328 |
| 2015/0023279 A1* | 1/2015 | Tomeba | H04L 5/0051 |
| | | | 370/329 |
| 2015/0098402 A1* | 4/2015 | Tomeba | H04L 25/03891 |
| | | | 370/329 |
| 2015/0270884 A1* | 9/2015 | Tomeba | H04B 7/0626 |
| | | | 370/329 |
| 2015/0282144 A1* | 10/2015 | Tomeba | H04B 7/0456 |
| | | | 370/329 |
| 2015/0304001 A1* | 10/2015 | Tomeba | H04B 7/04 |
| | | | 375/267 |
| 2015/0349932 A1* | 12/2015 | Onodera | H04L 5/0026 |
| | | | 370/329 |
| 2016/0049997 A1* | 2/2016 | Onodera | H04W 76/10 |
| | | | 370/329 |
| 2016/0173175 A1* | 6/2016 | Tomeba | H04L 25/03343 |
| | | | 370/329 |
| 2016/0254894 A1* | 9/2016 | Tomeba | H04L 1/0026 |
| | | | 370/329 |
| 2017/0237587 A1* | 8/2017 | Hildinger | H04L 25/4975 |
| | | | 370/201 |
| 2018/0019899 A1* | 1/2018 | Kuchi | H04L 5/0026 |
| 2018/0279267 A1* | 9/2018 | Yasukawa | H04W 72/04 |
| 2019/0028142 A1* | 1/2019 | Wang | H04B 1/7107 |
| 2019/0037609 A1* | 1/2019 | Harada | H04J 11/0073 |
| 2019/0319692 A1* | 10/2019 | Noh | H04L 5/0048 |
| 2019/0357159 A1* | 11/2019 | Pan | H04L 5/0007 |
| 2020/0373987 A1* | 11/2020 | Noh | H04L 25/03343 |
| 2021/0021308 A1* | 1/2021 | Kimura | H04B 7/0456 |
| 2021/0067215 A1* | 3/2021 | Song | H04B 7/0632 |
| 2021/0075483 A1* | 3/2021 | Song | H04B 7/0626 |
| 2021/0168818 A1* | 6/2021 | Wang | H04L 5/0048 |
| 2021/0211247 A1* | 7/2021 | Wang | H04L 1/0073 |
| 2021/0234739 A1* | 7/2021 | Matsumura | H04B 17/345 |

OTHER PUBLICATIONS

Written Opinion of the International Searching Authority issued in PCT/JP2018/018135 dated Jul. 24, 2018 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

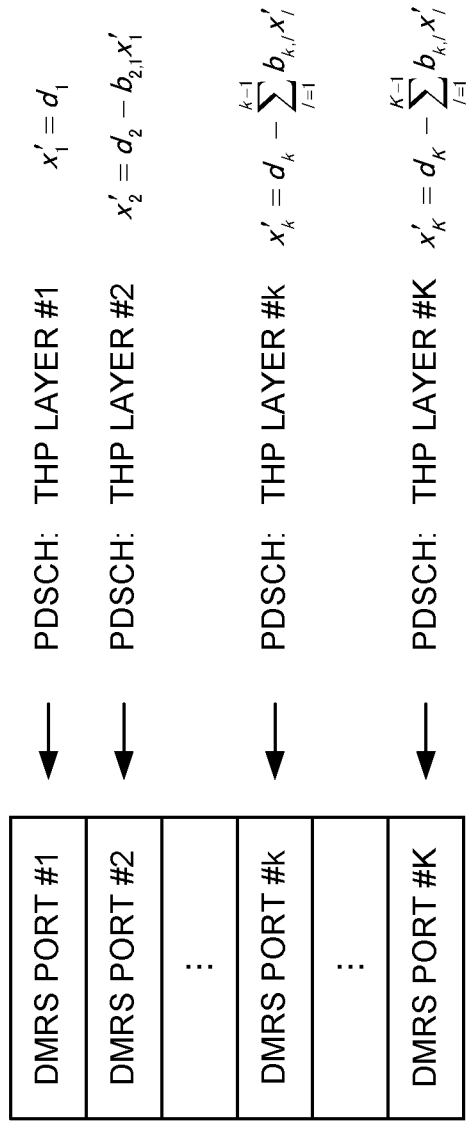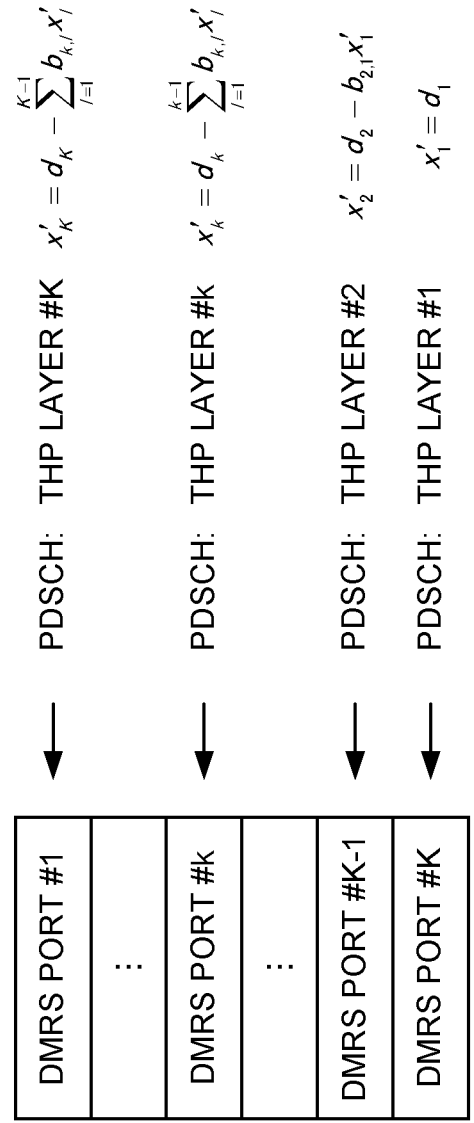

RECEPTION APPARATUS AND TRANSMISSION APPARATUS

TECHNICAL FIELD

The present invention relates to a receiving apparatus and a transmitting apparatus in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In LTE Rel. 10/11, for the purpose of broadbandization, carrier aggregation (CA) has been introduced in which a plurality of component carriers (CCs) are integrated. Each of the CCs is configured by using a system band in LTE Rel. 8 as one unit. In CA, a plurality of CCs of the same radio base station (eNB (eNodeB)) are configured for a user terminal (UE (User Equipment)).

On the other hand, in LTE Rel. 12, dual connectivity (DC) has been introduced in which a plurality of cell groups (CGs) of different radio base stations are configured for a UE. Each of the cell groups is constituted of at least one cell (CC). In DC, the plurality of CCs of the different radio base stations are integrated, and thus DC is also referred to as Inter-eNB CA and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR) are expected to implement various radio communication services satisfying different requirements (for example, ultra high speed, large capacity, ultra low latency, and so on).

For example, for 5G/NR, studies have been conducted regarding provision of radio communication services referred to as eMBB (enhanced Mobile Broad Band), IoT (Internet of Things), mMTC (massive Machine Type Communication), M2M (Machine To Machine), URLLC (Ultra Reliable and Low Latency Communications), and so on.

For 5G/NR, massive MIMO (Multi User Multi Input Multi Output) has been under study. This causes interference between a plurality of layers, and thus the problem is how to measure the interference.

In view of above, it is an object of the present disclosure to provide a receiving apparatus and a transmitting apparatus for appropriately measuring interference between a plurality of layers.

Solution to Problem

A receiving apparatus according to an aspect of the present invention includes a receiving section that receives a data signal, a demodulation reference signal, and a specific signal in at least one of a plurality of layers, and a control section that, based on the demodulation reference signal and the specific signal, estimates interference, controls transmission of a result of the estimation, and performs a modulo operation of the data signal.

Advantageous Effects of Invention

According to the present disclosure, the interference between the plurality of layers can be appropriately measured.

BRIEF DESCRIPTION OF DRAWINGS

FIGS. 6A and 6B are diagrams to show an example of mapping between layers and DMRS ports;

DESCRIPTION OF EMBODIMENTS

Figure 1:
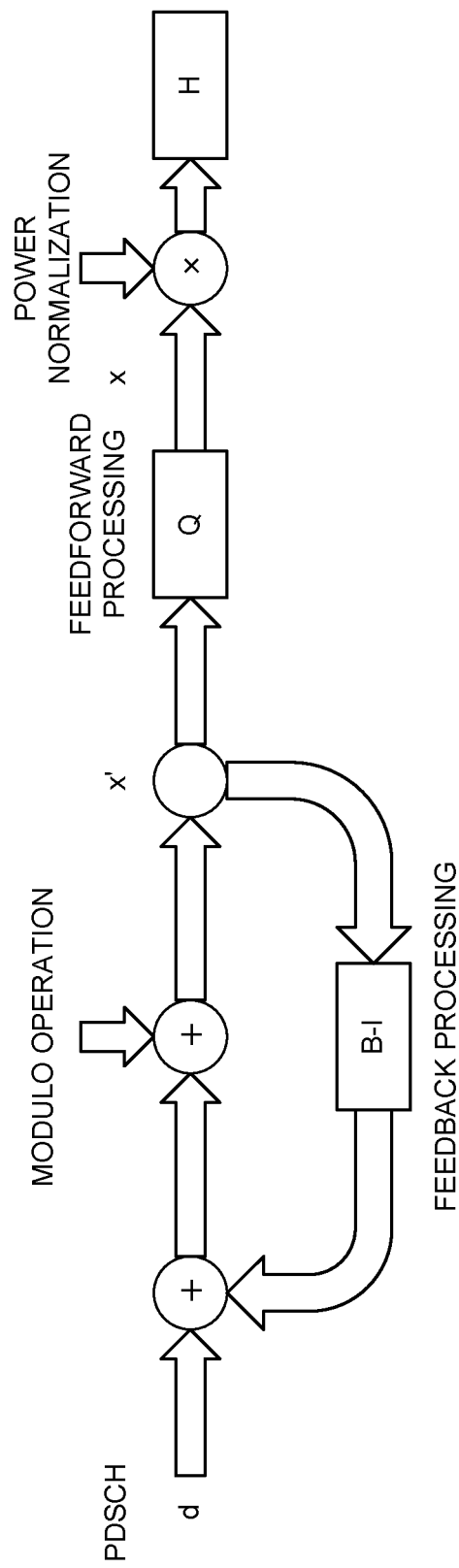
FIG. 1 is a diagram to show an example of THP.

The future radio communication systems are expected to implement various radio communication services satisfying different requirements (for example, ultra high speed, large capacity, ultra low latency, and so on). For example, for the future radio communication systems, studies have been conducted regarding communication utilizing beam forming (BF).

BF can be classified into digital BF and analog BF. Digital BF is a method for executing precoding signal processing on a baseband (for a digital signal). In this case, parallel processing of inverse fast Fourier transform (IFFT)/digital to analog converter (DAC)/RF (Radio Frequency) are required the number of which is equal to the number of antenna ports (RF Chain). On the other hand, at any timing, beams can be formed the number of which depends on the number of RF chains.

Analog BF is a method for using a phase shifter on an RF. In this case, the phase of the RF signal is simply rotated, and thus easy configuration and inexpensive implementation can be achieved. However, this prevents formation of a plurality of beams at the same timing. Specifically, analog BF allows only one beam to be formed at a time for each phase shifter.

Thus, when a base station (referred to as, for example, eNB (evolved Node B), BS (Base Station), gNB, and so on) includes only one phase shifter, one beam can be formed at a certain time. Accordingly, when a plurality of beams are transmitted using only analog BF, the beams are prevented from being simultaneously transmitted in the same time resource, and thus the beams need to be temporally switched or to be rotated.

Note that a hybrid BF configuration can be provided that includes a combination of digital BF and analog BF. For the future radio communication systems (for example, 5G), introduction of massive MIMO has been under study. However, forming an enormous number of beams simply by digital BF leads to an expensive circuit configuration. Thus, 5G is expected to utilize an analog BF configuration or a hybrid BF configuration.

BF operations include a single BF operation utilizing one BF and a multiple BF operation utilizing a plurality of BFs. In a cell using the single BF operation, a DL signal (for example, a reference signal) is transmitted in a single beam pattern (for example, with non-directivity) to form an area.

For NR, studies have been conducted regarding the execution, as an L1/L2 beam control method in a scenario in which a cell is configured by using a plurality of beams, of measurement reporting for beam selection using a CSI-RS (RS for CSI measurement, Channel State Information-Reference Signal) or a mobility reference signal (MRS). Here, the MRS may be a signal that can be used as an RS for RRM (Radio Resource Management) measurement and may be an existing synchronization signal (for example, a PSS/SSS), an existing reference signal (for example, a CRS, a CSI-RS), a signal obtained by expanding/changing any of the above-described signals, or the like.

Note that, in the RRM measurement reporting, the UE may report information related to received power (for example, RSRP (Reference Signal Received Power). In the CSI measurement reporting, the UE may report CSI related to at least one of a channel quality indicator (CQI), a precoding matrix indicator (PMI), a precoding type indicator (PTI), a rank indicator (RI), and so on.

Beams are distinguished from one another based on at least one of following (1) to (9), but the beams are not limited thereto: (1) resource (for example, time and/or frequency resource), (2) SS block (SS block index), (3) antenna port, (4) precoding (for example, presence of precoding, a precoding weight), (5) transmission power, (6) phase rotation, (7) beam width, (8) beam angle (for example, tilt angle), and (9) number of layers. The term "beam" as used herein may be used interchangeably with at least one of (1) to (9) listed above, and for example, the "beam" may be interpreted as "resource," "antenna port," or the like. Note that different precoding may involve a different precoding weight or a different precoding scheme (for example, linear precoding or nonlinear precoding). When linear/nonlinear precoding is applied to the beam, the transmission power, the phase rotation, the number of layers, or the like may be changed.

Examples of nonlinear precoding include THP (Tomlinson Harashima Precoding), vector perturbation (VP), and so on. Studies have been conducted regarding the use of THP for a MIMO scheme, basic physical layer (PHY) design, acquisition of channel state information (CSI) in transmission and reception, reference signal (RS) design, user scheduling, detailed signal design, and so on.

For CSI acquisition, studies have been conducted regarding the use of THP for CSI measurement and feedback in a receiving apparatus.

Overview of THP will be described.

As shown in FIG. 1, THP includes triangulation of a channel using QR or GMD (Geometric Mean Decomposition), successive interference cancellation (SIC, feedback processing) at the transmission side using complete CSI-T (CSI at transmitter, channel state information on transmission side), and a modulo operation for controlling symbol power.

As indicated by the equation below, a modulo operation and feedback processing (SIC) are performed on a transmission symbol (data signal) $d_k$ in a THP layer k to obtain $x'_k$.

[Formula 1]

$$x'_k = d_k + 2\sqrt{\alpha}\,(p_I + jp_Q) - \sum_{l=1}^{k-1} b_{k,l} x'_l \quad \text{(Equation 1)}$$

In this equation, the third item on the right side indicates an interference vector in THP layers 1 to k−1 for the THP layer k. The SIC subtracts (removes, cancels) interference from the transmission symbols $d_k$. The second item on the right side indicates a modulo vector used to control symbol power. $p_I$ and $p_Q$ are integers. The modulo operation adds a modulo vector to a signal.

A feedback processing matrix B with an element $b_{k,l}$ is obtained from a channel matrix H as indicated by the equations below.

[Formula 2]

$$H^H = QR \quad \text{(Equation 2)}$$
$$B = GR^H$$
$$G = \text{diag}\left(\frac{1}{R_{11}}, \ldots, \frac{1}{R_{KK}}\right)$$

Here, a feedforward processing matrix (unitary matrix) Q and a covariance matrix R are obtained by QR decomposition (triangulation of a channel).

A result $x'_k$ of the SIC and the modulo operation is used for the SIC. Feedforward processing is executed in which $x'_k$ is multiplied by the feedforward processing matrix Q.

Power normalization is performed in which a result x of the feedforward processing is multiplied by $1/\sqrt{P_{max}}$, and the channel matrix H is obtained.

Now, the SIC in THP will be described.

An equivalent channel R (triangular matrix) is triangulated by using the feedforward processing matrix Q. A procedure of the SIC in THP is as described below.

(1) A data signal $d_1$ in a first THP layer (THP layer #1) is transmitted directly as a transmission signal $x'_1$ with no interference cancellation.

(2) A data signal $d_2$ in a second THP layer (THP layer #2) is transmitted as a transmission signal $x'_2$ resulting from pre-cancellation of interference from the first THP layer.

(3) A data signal $d_k$ in a k-th THP layer (THP layer #k) is transmitted as a transmission signal $x'_k$ resulting from pre-cancellation of interference (interference vector) in the first THP layer to a (k−1)-th THP layer.

The transmission signals $x'_1$, $x'_2$, and $x'_k$ is represented by the equations below.

[Formula 3]

$$x'_1 = d_1$$
$$x'_2 = d_2 - b_{2,1} x'_1$$
$$\vdots$$
$$x'_k = d_k - \sum_{l=1}^{k-1} b_{k,l} x'_l$$

(Equation 3)

Now, an example of THP processing will be described.

Figure 2A:
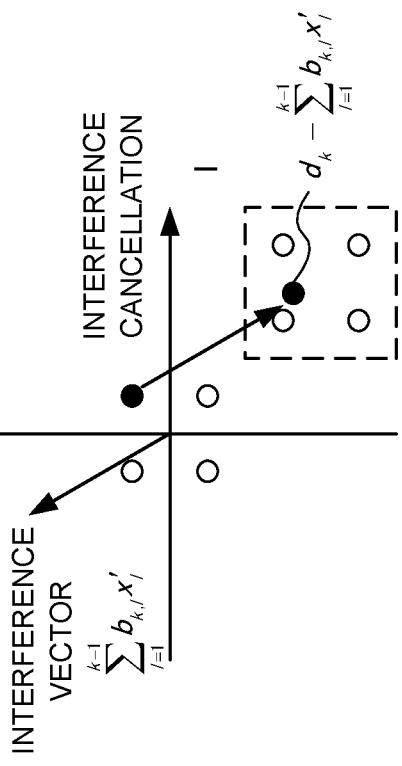
FIGS. 2A to 2D are diagrams to show an example of THP processing in a transmitting apparatus.

A transmitting apparatus obtains a transmission symbol $d_k$ in the k-th THP layer as shown in FIG. 2A.

Figure 2B:
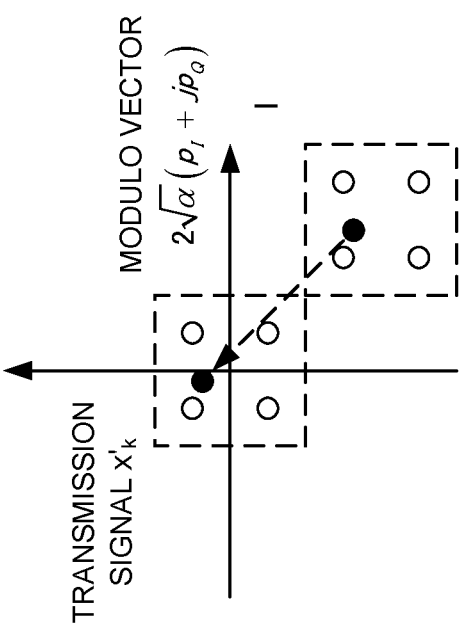

Subsequently, the transmitting apparatus cancels, from the transmission symbol, interference vectors from the THP layers from the first THP layer to the (k−1)-th THP layer as shown in FIG. 2B. A result of interference cancellation is represented by the expression below.

[Formula 4]

$$d_k - \sum_{l=1}^{k-1} b_{k,l} x'_l$$

(Expression 4)

Figure 2C:
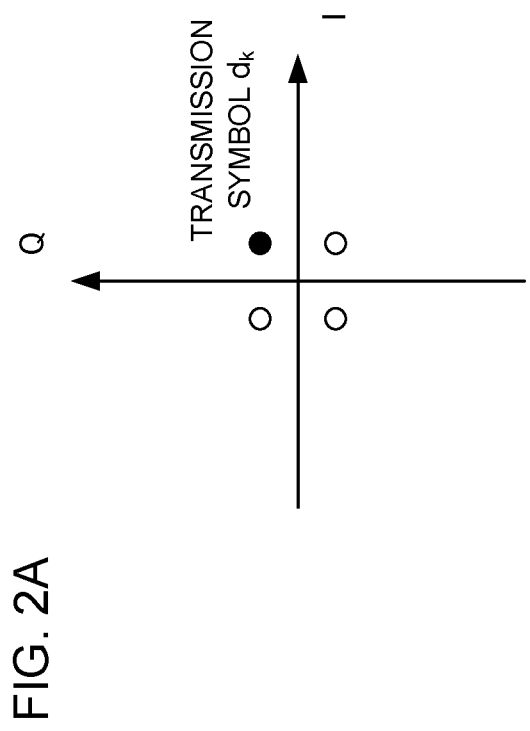

FIG. 2C shows a boundary a of the modulo operation.

Figure 2D:
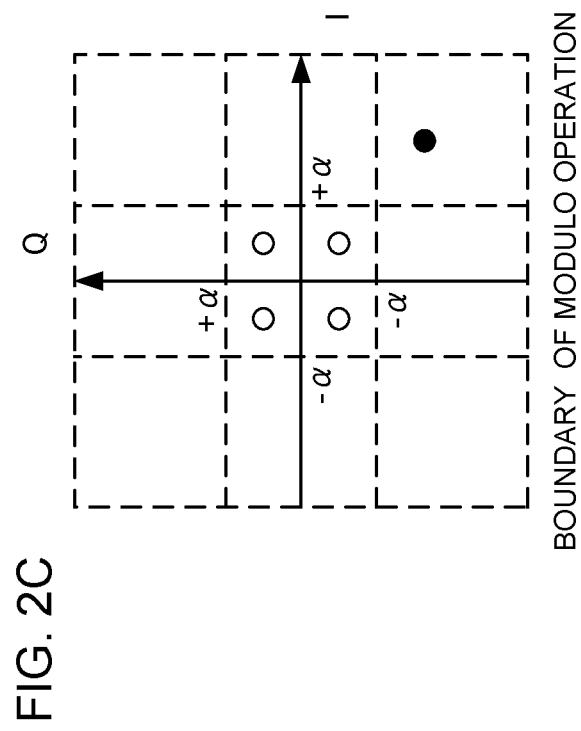

Subsequently, the transmitting apparatus performs a modulo operation on the result of interference cancellation to obtain a transmission signal $x'_k$ as illustrated in FIG. 2D. The modulo operation may add the modulo vector to the result of interference cancellation. The transmission signal $x'_k$ is represented by the equation below.

[Formula 5]

$$x'_k = d_k - \sum_{l=1}^{k-1} b_{k,l} x'_l + 2\sqrt{\alpha}\,(p_I + j p_Q)$$

(Equation 5)

Here, the modulo vector is represented by the third item on the right side.

Figure 3A:
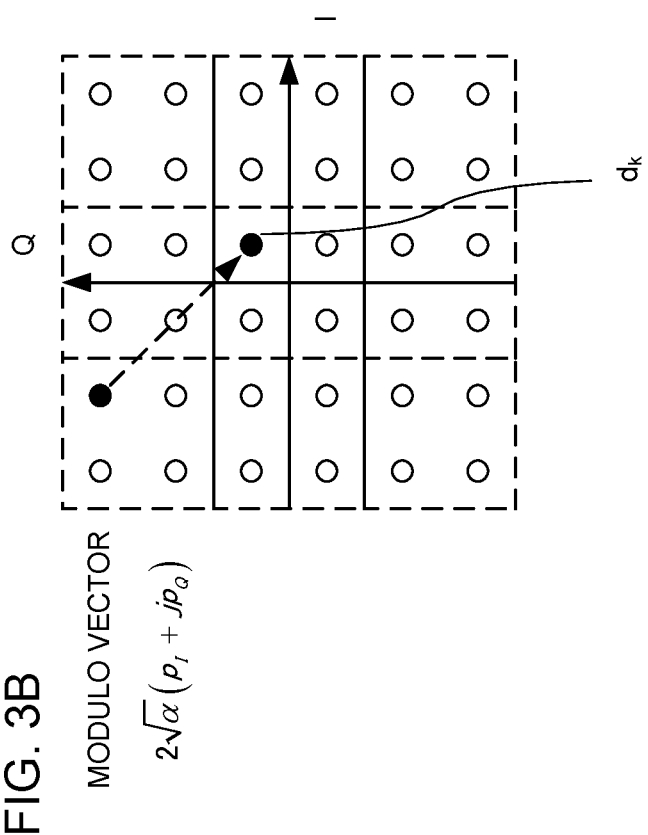
FIGS. 3A and 3B are diagrams to show an example of THP processing in a receiving apparatus.

With no noise, the receiving apparatus receives a received signal $r_k$ obtained by adding the above-described interference vector to the transmission signal $x'_k$ as illustrated in FIG. 3A. The receiving section $r_k$ is represented by the equation below.

[Formula 6]

$$r_k = d_k + 2\sqrt{\alpha}(p_I + j p_Q)$$

(Equation 6)

Figure 3B:
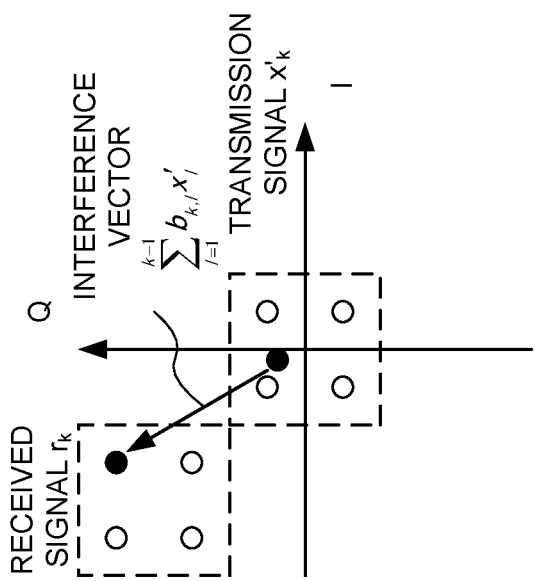

Subsequently, the receiving apparatus performs a demodulo operation on the received signal $r_k$ to obtain the transmission symbol $d_k$ as illustrated in FIG. 3B. The demodulo operation is similar to the modulo operation and may add the modulo vector to the received signal $r_k$.

Now, DMRS transmission for THP will be described.

A UE receiver typically uses a DMRS port in another layer to estimate a covariance matrix (weights for receiving antennas) for interference for an MMSE (Minimum Mean Square Error)-IRC (Interference Rejection Combining) receiver. The weights create a local minimum point (null) of an antenna gain in the arrival direction of interference. The DMRS port is an antenna port allocated to a DMRS.

For accurate estimation of a channel, DMRSs at a plurality of DMRS ports are typically transmitted at orthogonal ports (antenna ports) for an NR or LTE system.

Figure 4:
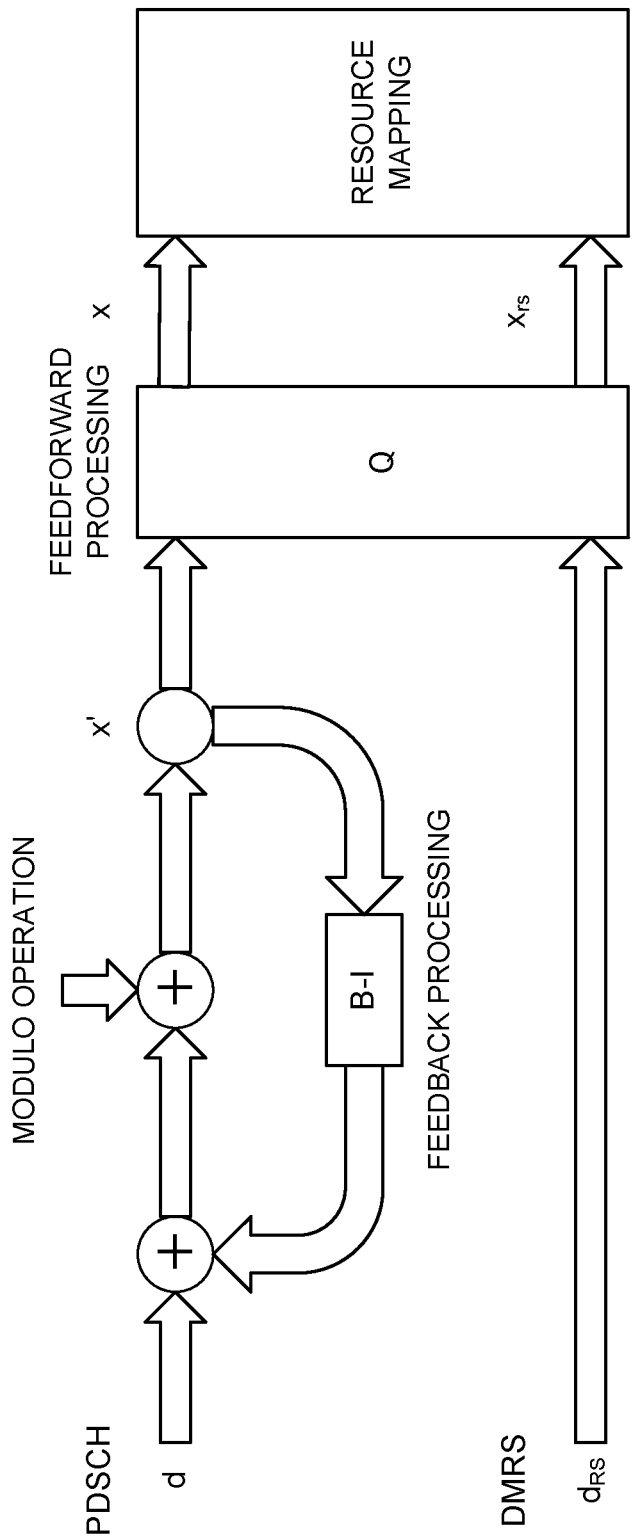
FIG. 4 is a diagram to show an example of THP with DMRS transmission.

As shown in FIG. 4, in THP with an existing DMRS transmission scheme, processing, on the transmission symbol $d$, of the PDSCH in the upper stage includes the SIC and the modulo operation on the transmission side. This interference is actual interference which the UE receives. In the processing, on the transmission symbol $d_{RS}$, of the DMRS in the lower stage, the SIC on the transmission side is not applied. Accordingly, the UE receives a signal from the interference DMRS port. The DMRS is transmitted at the orthogonal port, preventing the SIC from being based on the DMRS signal. The modulo operation is prevented from being applied to the DMRS port, and thus the SIC is not applied to the DMRS signal.

Different signal processing is executed on the received DMRS signal, and thus the received DMRS signal is not used to estimate the covariance matrix used for the IRC receiver.

Now, DMRS transmission for THP will be described.

To control multiuser interference (MUI) of the DMRS, the DMRS is typically transmitted in an orthogonal resource or a pseudo orthogonal resource for the actual system. When the DMRS is transmitted in the orthogonal resource, the application of the SIC is not required. The same feedforward processing (Q) is applied to both DMRS and PDSCH (data signal), facilitating channel estimation.

The modulo operation makes amplitude and phase ambiguous and is thus not applied to the DMRS. When the SIC is applied to the DMRS, the problem is control of the power of a DMRS symbol.

In THP using the existing DMRS transmission scheme, interference in the DMRS differs from interference in the PDSCH.

Now, the existing IRC receiver and CQI feedback will be described.

The weights for the receiving antennas estimated by the linear MMSE-IRC receiver is represented by, for example, the equation below.

[Formula 7]

$$w = h^H (R_S + R_{MUI} + R_{ICI} + \sigma^2 I)^{-1}$$

(Equation 7)

Here, $R_S$ is a covariance matrix of signals and is measured at a dedicated DMRS port allocated to the receiver. $R_{MUI}$ is a covariance matrix of MUI and may be measured at another DMRS port of the existing system. Because of the DMRS transmission scheme for THP, being measured is impossible. $R_{ICI}$ is a covariance matrix of ICI (inter-cell interference) and is measured using CSI-IM (Interface Measurement).

The CQI measured by the receiving apparatus and fed back to the transmitting apparatus is represented by, for example, the equation below.

[Formula 8]

$$CQI = \frac{P_S}{P_{MUI} + P_{ICI} + N} \quad \text{(Equation 8)}$$

Here, $P_S$ is the dedicated channel power of a signal for the receiver and is measured in an NZP (Non-Zero Power) CSI-RS resource or DMRS resource. $P_{MUI}$ is MUI power and may be measured in the NZP CSI-RS resource or DMRS resource. An NZP CSI-RS or DMRS transmission method using THP poses a similar problem. $P_{ICI}$ is ICI power and is measured by using a CSI-IM resource.

Demodulation and CQI feedback require MUI power and estimation of the covariance matrix. An RS such as the DMRS or the CSI-RS may be used for this purpose.

However, when the RS is precoded by using THP, the problem is how to measure MUI in the RS.

MIMO layers may be provided with respective THP layer numbers according to the order of steps of THP processing. In the existing RS transmission scheme, the interference to the k-th THP layer from the succeeding THP layers (from the (k+1)-th THP layer to the last THP layer) can be directly estimated at the corresponding RS port. The interference to the k-th THP layer from the THP layers (from the first THP layer to the (k−1)-th THP layer) fails to be directly estimated at the corresponding RS port. A result of estimation of interference in the preceding THP layers may be higher than the actual level.

Thus, the inventors of the present invention came up with the idea that, in addition to the certain DMRS, a specific signal (certain RS) is used for interference measurement for nonlinear precoding.

Embodiments according to the present disclosure will be described in detail with reference to the drawings. The radio communication method according to each embodiment may be employed independently or may be employed in combination.

In the description below, description will be given of a method for nonlinear precoding for a DL signal (for example, the PDSCH, the RS) when the transmitting apparatus is a radio base station (that may be referred to as a gNB, an eNB, a network, and so on) and where the receiving apparatus is a UE. Note that this method is also applicable to an UL signal (for example, a PUSCH, the RS) when the transmitting apparatus is a UE and where the receiving apparatus is a radio base station.

(First Aspect)

An additional DMRS in a DMRS structure in NR may be used for the interference measurement.

The radio base station may map a multiuser or multilayer signal to a plurality of DMRS ports according to the order of steps of THP layer processing.

Figure 5:
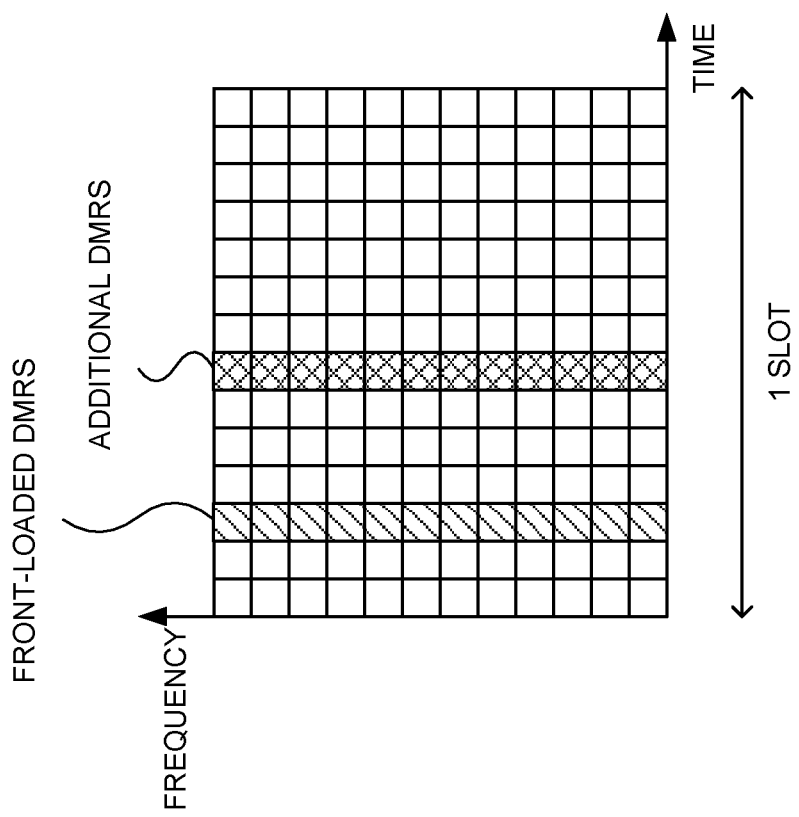
FIG. 5 is a diagram to show an example of a structure of a front-loaded DMRS and an additional DMRS according to a first aspect.

The interference measurement may be performed by utilizing a front-loaded DMRS and the additional DMRS in NR. The front-loaded DMRS may be arranged at the third symbol in a slot where allocation of data is started. In a case of being configured by an upper layer, the additional DMRS may be arranged to succeed the front-loaded DMRS in the slot as shown in FIG. 5. The front-loaded DMRS, the additional DMRS, and the PDSCH may be arranged within one slot.

The UE may estimate a dedicated channel allocated to the UE by using only the front-loaded DMRS. The UE may estimate the interference by combining signals from the front-loaded DMRS and the additional DMRS.

The transmission signal for the front-loaded DMRS may be represented by the equation below.

[Formula 9]

$$x_k^{r(1)} = d_{RSk} \quad \text{(Equation 9)}$$

For the front-loaded DMRS, the DMRS signal may be directly transmitted as defined in the existing specifications. The UE may use the front-loaded DMRS to estimate the dedicated channel.

As a transmission method for the additional DMRS, one of following transmission methods 1 to 3 may be used.
(Transmission Method 1) The transmission signal for the front-loaded DMRS may be represented by the equation below.

[Formula 10]

$$x_k'^{(2)} = d_{RSk} + 2\sqrt{\alpha}\,(p_I + jp_Q) - \sum_{l=1}^{k-1} b_{k,l} x_l' \quad \text{(Equation 10)}$$

In other words, the transmission signal is a signal using, for an additional DMRS symbol, complete THP processing including the SIC and the modulo operation. SIC and a modulo operation similar to the SIC and the modulo operation for a data signal may be used for the transmission signal.
(Transmission Method 2) The transmission signal for the additional DMRS may be represented by the equation below.

[Formula 11]

$$x_k'^{(2)} = 2\sqrt{\alpha}\,(p_I + jp_Q) - \sum_{l=1}^{k-1} b_{k,l} x_l' \quad \text{(Equation 11)}$$

In other words, the transmission signal includes only the portions of the SIC and the modulo operation. The transmission signal includes no DMRS symbol. SIC and a modulo operation similar to the SIC and the modulo operation for the data signal can be used for the transmission signal.
(Transmission Method 3) The transmission signal for the additional DMRS may be represented by the equation below.

[Equation 12]

$$x_k'^{(2)} = \sum_{l=1}^{k-1} b_{k,l} x_l' \quad \text{(Equation 12)}$$

In other words, the transmission signal includes only the portion of the SIC. The transmission signal includes no DMRS symbol. SIC similar to the SIC for the data signal may be used for the transmission signal.

For the transmission method 1, the UE can use the front-loaded DMRS and the additional DMRS to estimate the interference. For the transmission methods 2 and 3, the UE can use the additional DMRS to estimate the interference. However, for the transmission methods 2 and 3, transmission power is unable to be controlled.

Now, mapping between the DMRS port and the THP layer will be described.

The UE has, for the interference measurement, different procedures for the succeeding THP layers and for the preceding THP layers. For the preceding THP layers, the UE estimates the interference by using both DMRSs. For the succeeding THP layers, the UE estimates the interference by using only the front-loaded DMRS.

Information indicating mapping may be reported from the radio base station to the UE.

The radio base station maps the THP layers to the DMRS ports according to the order of the THP layers. A mapping method may be one of mapping methods 1 and 2 described below.

(Mapping Method 1) As shown in FIG. 6A, the PDSCH may be mapped to the DMRS ports in order of increasing THP layer number.

(Mapping Method 2) As shown in FIG. 6B, the PDSCH may be mapped to the DMRS ports in order of decreasing THP layer number.

Here, as indicated by Equation 3, for the transmission symbol for the PDSCH in the k-th THP layer, the interference from the preceding THP layers to the k-th THP layer is canceled.

These mapping methods allow the THP layers to be appropriately mapped to the DMRS ports.

Now, UE operations will be described.

For the dedicated THP layer (k-th THP layer) allocated to the UE, the UE may use both RSs of the front-loaded DMRS and the additional DMRS to estimate the interference from the preceding THP layers to the k-th THP layer. As an estimation method for the interference from the preceding THP layers to the k-th THP layer, one of the following estimation methods 1 and 2 may be used depending on the transmission method for the additional DMRS.

(Estimation Method 1)

When the above-described transmission method 1 is used, the interference from the preceding THP layers to the k-th THP layer may be estimated as indicated by the expression below.

[Formula 13]

$$\sum_{l=1}^{k-1} y_l'^{(1)} + y_k'^{(2)} - y_k'^{(1)} \qquad \text{(Expression 13)}$$

Here, $y'^{(1)}_k$ is a received signal for the front-loaded DMRS at a DMRS port #k. $y'^{(2)}_k$ is a received signal for the additional DMRS at the DMRS port #k. In other words, in the estimation method 1, the UE uses the front-loaded DMRS resources at the DMRS ports corresponding to the preceding THP layers, the front-loaded DMRS resource at the DMRS port corresponding to the k-th THP layer, and the additional DMRS resource at the DMRS port corresponding to the k-th THP layer to estimate the interference to the k-th THP layer from the preceding THP layers.

(Estimation Method 2)

When the above-described transmission method 2 or transmission method 3 is used, the interference to the k-th THP layer from the preceding THP layers may be estimated as indicated by the expression below.

[Formula 14]

$$\sum_{l=1}^{k} y_l'^{(1)} + y_k'^{(2)} \qquad \text{(Expression 14)}$$

In other words, in the estimation method 2, the UE uses the front-loaded DMRS resources at the DMRS ports corresponding to the preceding THP layers, the front-loaded DMRS resource at the DMRS port corresponding to the k-th THP layer, and the additional DMRS resource at the DMRS port corresponding to the k-th THP layer to estimate the interference to the k-th THP layer from the preceding THP layers.

These transmission methods allow the interference to the k-th THP layer from the preceding THP layers to be estimated by using the front-loaded DMRS and the additional DMRS.

The UE may use the front-loaded DMRS (front-loaded DMRS resource at the DMRS port corresponding to the k-th THP layer) to estimate the channel in the k-th THP layer.

The UE may use the front-loaded DMRSs (front-loaded DMRS resources at the DMRS ports corresponding to the succeeding THP layers) to estimate the interference to the k-th THP layer from the succeeding THP layers.

The UE may feed back to the radio base station, at least one (CQI) of the result of channel estimation for the k-th THP layer, the result of interference estimation for the preceding THP layers, and the result of interference estimation for the succeeding THP layers. The radio base station may perform the SIC by using the result of interference estimation for the preceding THP layers from the UE in the k-th THP layer. The radio base station may perform the feedforward processing by using the result of channel estimation from the UE in the k-th THP layer.

The UE may demodulate the PDSCH based on the front-loaded DMRS (result of channel estimation) for the k-th THP layer.

The UE may be assumed to have one additional DMRS configured for the interference measurement. When more than one additional DMRS is configured, the UE may select one of the plurality of additional DMRSs configured.

The radio base station may report to the UE that the additional DMRS is intended for the interference (MUI) measurement for THP.

The transmission and reception of the data signal (transmission symbol $d_k$) may be performed as in the case of FIGS. 1 to 3.

According to the first aspect, the MMSE-IRC receiver of the receiving apparatus can be caused to cancel the multiuser interference, allowing reception quality to be improved. The RS of NR can be utilized, and thus no additional RS needs to be introduced.

According to the first aspect, it is sufficient to add the configuration of the additional DMRS and the corresponding UE operation, and thus the first aspect produces less effects on the specifications than the second aspect. The configuration of the additional DMRS may be performed by a higher layer (RRC configuration), for example. According to the first aspect, the receiving apparatus can perform the interference estimation more accurately than the second aspect.

(Second Aspect)

An RS other than the DMRS may be used for the interference measurement.

The front-loaded DMRS and another RS may be used for the interference measurement. In other words, another RS may be used instead of the additional DMRS in the first aspect. The another RS may be at least one of CRI-RS, PTRS (Phase Tracking Reference Signal) and TRS (Tracking Reference Signal).

The additional DMRS in the first aspect may be interpreted as the another RS.

Figure 7:
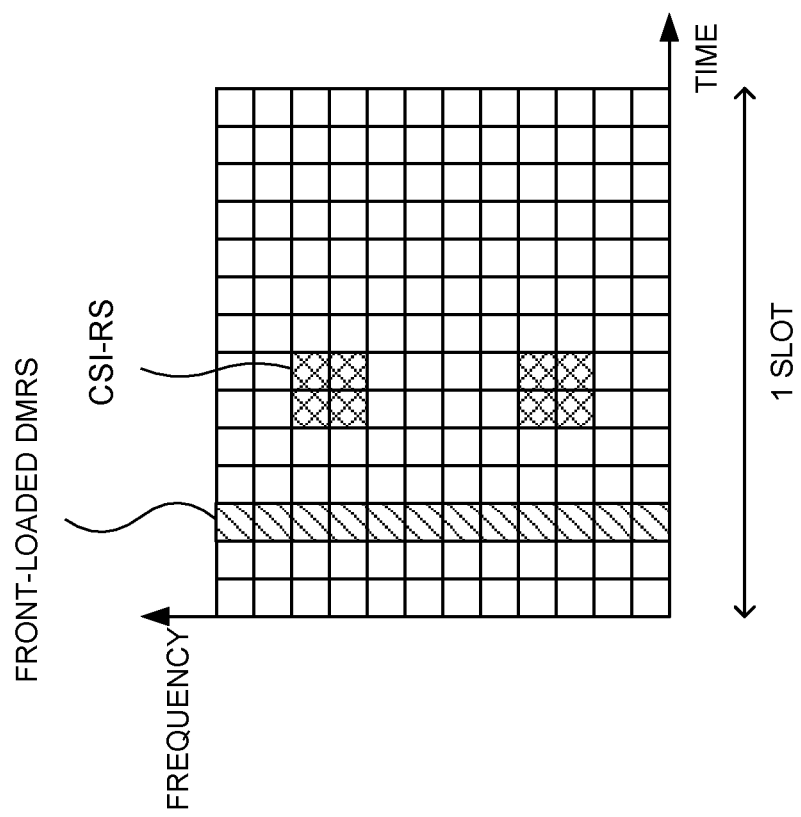
FIG. 7 is a diagram to show an example of a structure of a front-loaded DMRS and a CSI-RS according to a second aspect.

When the another RS is the CSI-RS (NZP CSI-RS), the CSI-RS may be arranged to succeed the front-loaded DMRS in the slot as shown in FIG. 7.

For the interference estimation, a new type of CSI-RS resource set may be introduced. The CSI-RS resource set may be triggered (scheduled) with the PDSCH. The CSI-RS resource set may have the same bandwidth allocation as that for the corresponding PDSCH.

The radio base station may determine which of a plurality of types of RSs is used for the interference measurement. The radio base station may select an RS for the interference measurement (another RS) from the plurality of types of RSs and report the RS to the UE. Priorities may be configured for the plurality of types of RSs, and based on the priorities, the UE may determine an RS for the interference measurement (another RS) from the plurality of types of RSs.

According to the second aspect, the MMSE-IRC receiver of the receiving apparatus can be caused to cancel the multiuser interference, allowing reception quality to be improved. The RS of NR can be utilized, and thus no additional RS needs to be introduced.

The second aspect allows overheads to be reduced compared to the first aspect.

(Third Aspect)

A similar approach may be employed for estimation of an NZP CSI-RS-based channel and interference.

For the channel measurement, a group of CSI-RS resources (CSI-RS resource set #1) may be configured for the UE. For the THP interference measurement, a group of CSI-RS resources (CSI-RS resource set #2) may be configured for the UE. The CSI-IM may be configured as is the case with the existing system.

Now, UE operations in derivation of CQI will be described.

The channel power may be measured in the CSI-RS resource set #1. The MUI may be measured by using both CSI-RS resource sets #1 and #2. For example, the MUI may be the "result of measurement of the CSI-RS resource set #2"–the "result of measurement of the CSI-RS resource set #1."

According to the third aspect, the CSI-RS resource set is used for the channel measurement and the interference measurement, allowing for easy processing of configuration, and switching of resources.

(Fourth Aspect)

For configuration of the additional DMRS, one of the following method 1 and method 2 may be used.

(Method 1) When the additional DMRS is not configured for the UE by using at least one of the higher layer and the DCI, the UE may perform the interference measurement in accordance with the second aspect or the third aspect.

(Method 2) For the nonlinear precoding, when the additional DMRS is not configured for the UE by using at least one of the higher layer and the DCI, the UE may assume that one additional DMRS is configured, and receive the additional DMRS. In this case, the UE performs the interference measurement in accordance with the first aspect.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 8:
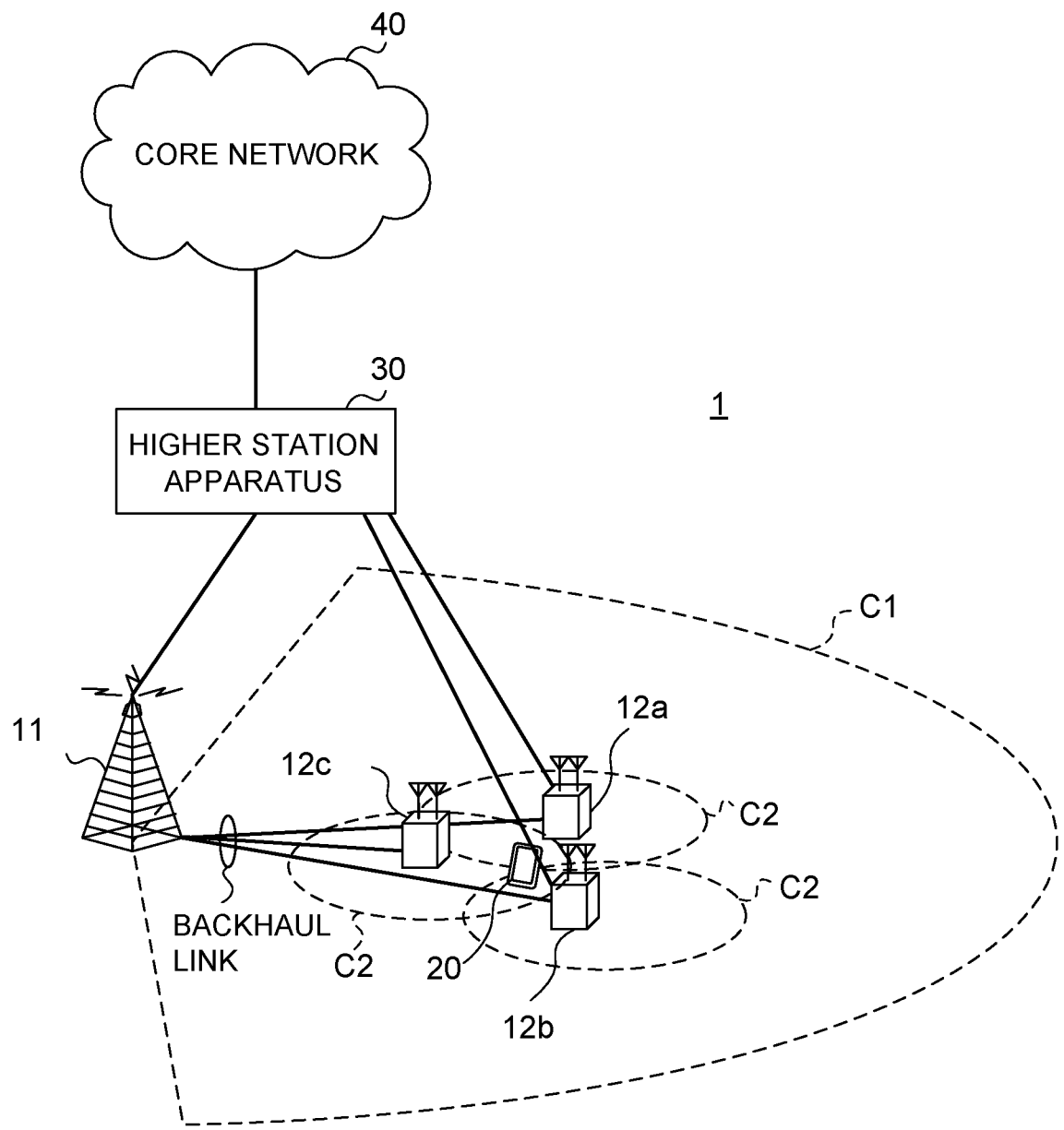
FIG. 8 is a diagram to show an example of a schematic structure of the radio communication system according to one embodiment of the present invention.

FIG. 8 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may employ CA or DC by using a plurality of cells (CCs) (for example, five or more CCs, six or more CCs.

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "aggregate node," an "eNB (eNodeB)," a "transmitting/receiving point" and so on. The radio base stations 12 are radio base stations having local coverages, and may be referred to as "small base stations," "micro base stations," "pico base stations," "femto base stations,"

"HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 9:
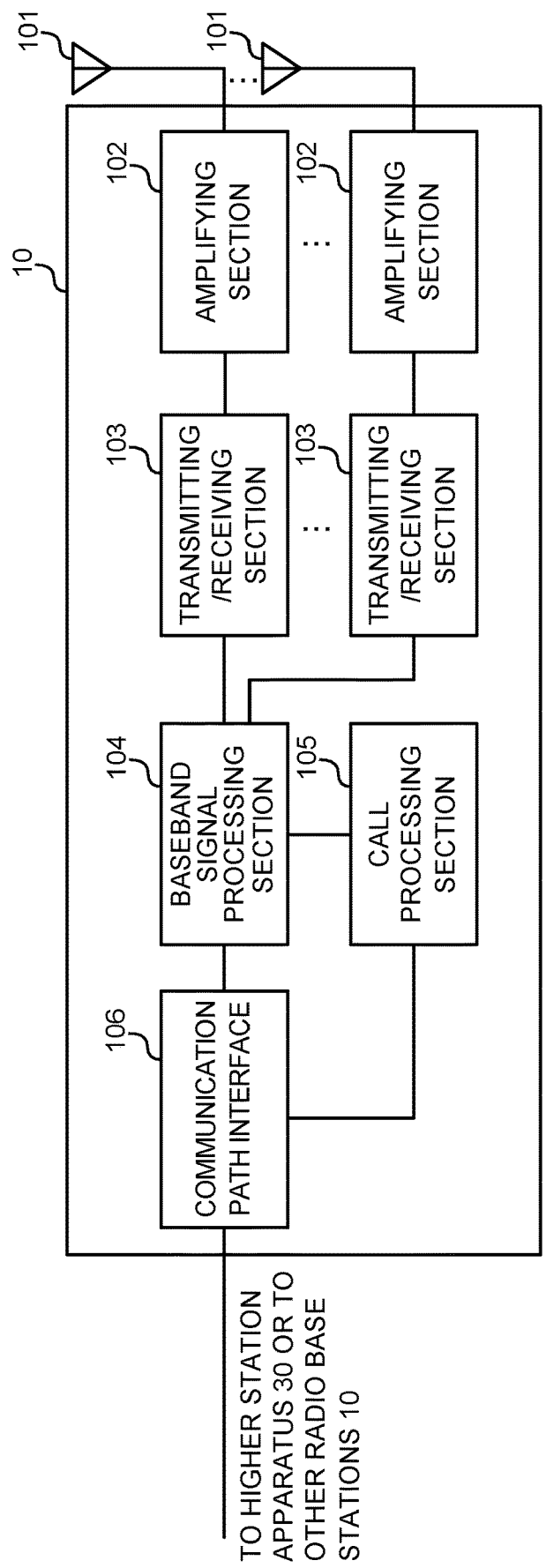
FIG. 9 is a diagram to show an example of an overall structure of a radio base station according to one embodiment of the present invention.

FIG. 9 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 may transmit the data signal (for example, the PDSCH), the demodulation reference signal (for example, the front-loaded DMRS), and the specific signal (for example, the additional DMRS, another RS) in the respective plurality of layers (for example, the THP layers).

The transmitting/receiving sections 103 may receive the data signal (for example, the PUSCH), the demodulation reference signal, and the specific signal in at least one of the plurality of layers.

Figure 10:
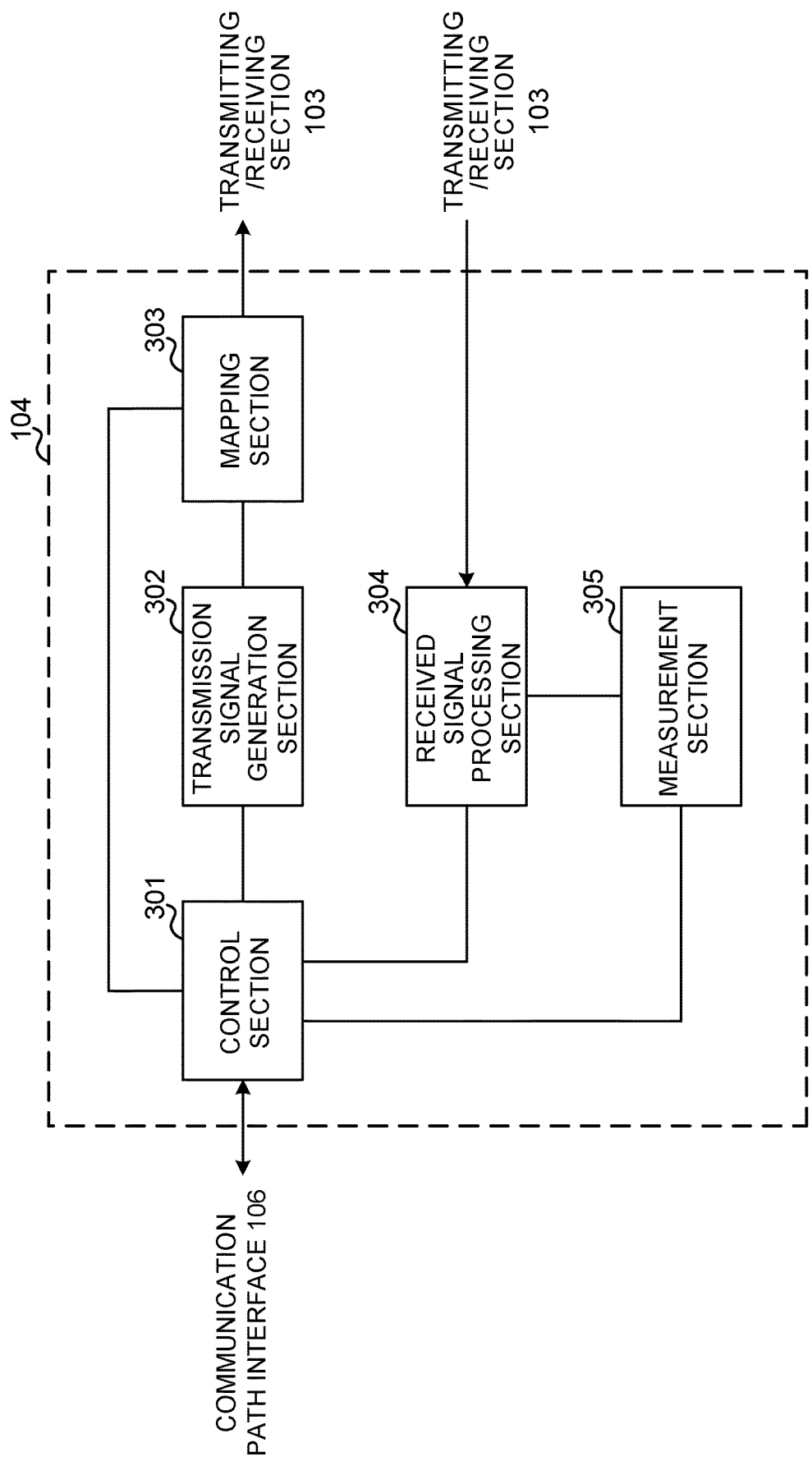
FIG. 10 is a diagram to show an example of a functional structure of the radio base station according to one embodiment of the present invention.

FIG. 10 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

Based on the modulo operation and the interference estimated based on the above-described demodulation reference signal and the above-described specific signal (for example, the interference to the k-th THP layer from the preceding THP layers), the control section 301 may control the transmission of the above-described data signal and control the transmission of the above-described specific signal based on the above-described interference.

Based on the above-described demodulation reference signal and the above-described specific signal, the control section 301 may estimate the interference, control the transmission of the result of the above-described estimation (for example, the interference to the k-th THP layer from the preceding THP layers, the interference to the k-th THP layer from the succeeding THP layers, or the like), and perform the modulo operation of the above-described data signal.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on).

The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 11:
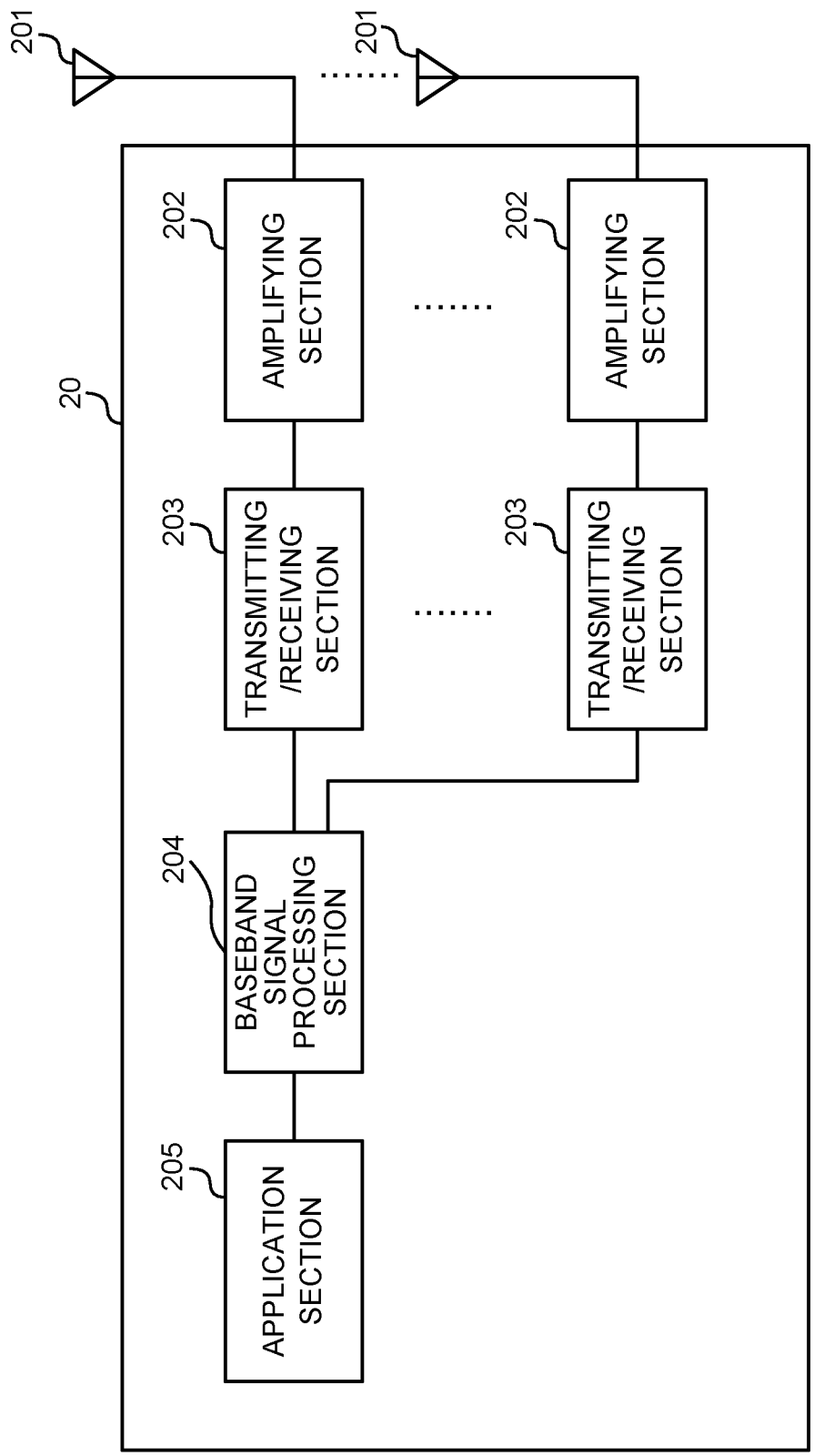
FIG. 11 is a diagram to show an example of an overall structure of a user terminal according to one embodiment of the present invention.

FIG. 11 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204, and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may receive the data signal (for example, the PDSCH) and the demodulation reference signal (for example, the front-loaded DMRS) and the specific signal in at least one of the plurality of layers.

The transmitting/receiving sections 203 may transmit the data signal (for example, the PUSCH), the demodulation reference signal, and the specific signal in the respective plurality of layers.

Figure 12:
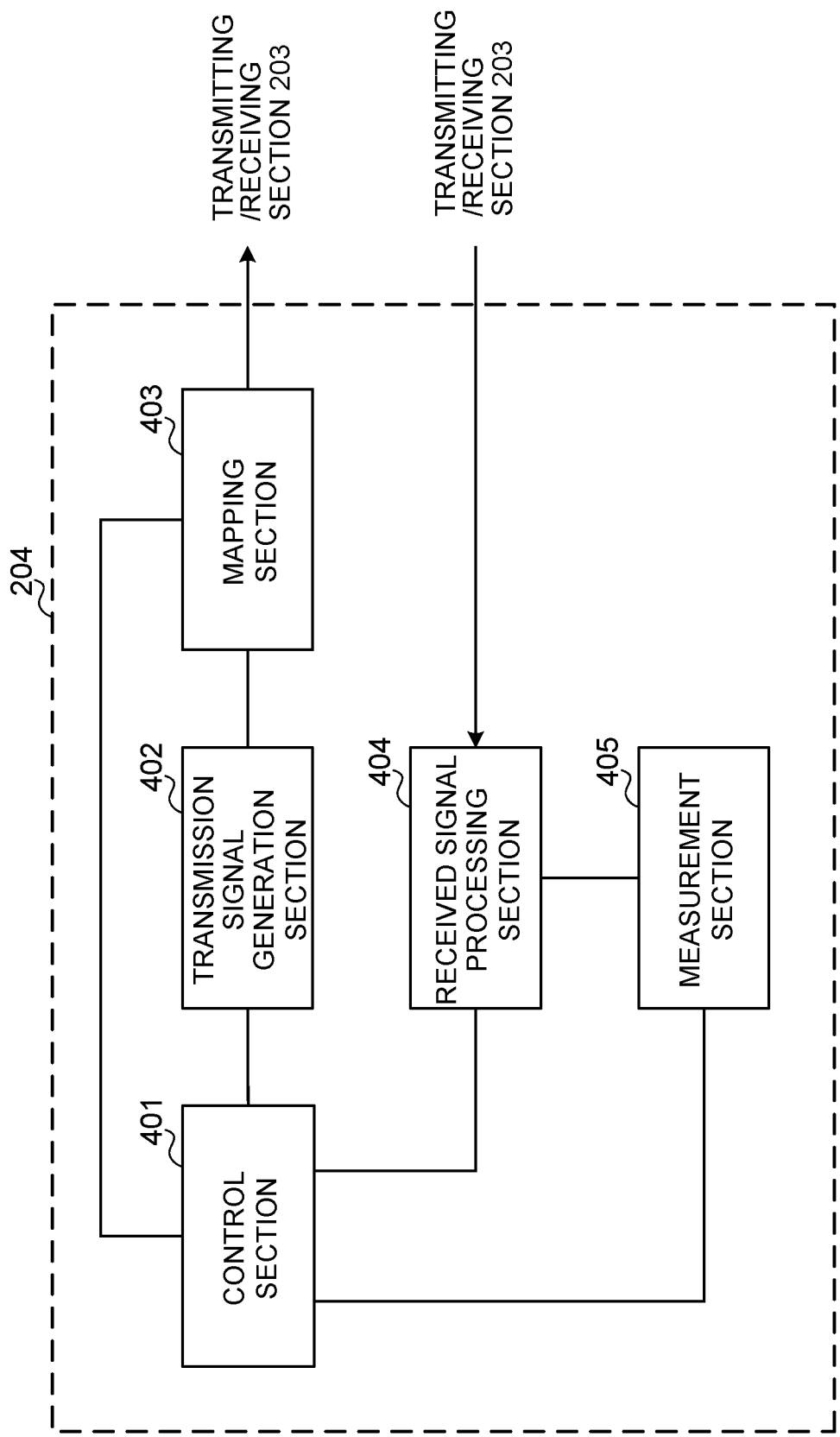
FIG. 12 is a diagram to show an example of a functional structure of the user terminal according to one embodiment of the present invention.

FIG. 12 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

Based on the above-described demodulation reference signal and the specific signal, the control section 401 may estimate the interference, control the transmission of the result of the above-described estimation (for example, the interference to the k-th THP layer from the preceding THP layers, the interference to the k-th THP layer from the succeeding THP layers, or the like) (for example, Expressions 13 and 14), and perform the modulo operation of the above-described data signal (for example, FIG. 3B).

A dedicated layer (k-th THP layer, the dedicated THP layer) in the plurality of layers may be allocated to the receiving apparatus. The data signal in the above-described dedicated layer and the specific signal in the above-described dedicated layer may be transmitted based on the interference to the above-described dedicated layer from specific layers (for example, the preceding THP layers) with layer numbers smaller than the layer number of the above-described dedicated layer (for example, Equations 10 to 12).

The control section 401 may estimate the interference to the above-described dedicated layer from the above-described specific layers (for example, Expressions 13 and 14), based on signals received in the demodulation reference signal resources in the above-described specific layers, a signal received in the demodulation reference signal resource in the above-described dedicated layer, and a signal received in the specific signal resource in the above-described dedicated layer.

The specific signals in the respective plurality of layers may be transmitted by employing the modulo operation (for example, Equations 10 and 11).

The above-described plurality of layers may be mapped to the ports for the reference signals for demodulation according to a certain order (for example, an ascending order in THP layer number, a descending order in THP layer number) (for example, FIG. 6).

Based on the modulo operation and the interference estimated based on the above-described demodulation reference signal and the above-described specific signal (for example, the interference to the k-th THP layer from the preceding THP layers), the control section 401 may control the transmission of the above-described data signal and control the transmission of the above-described specific signal based on the above-described interference.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 13:
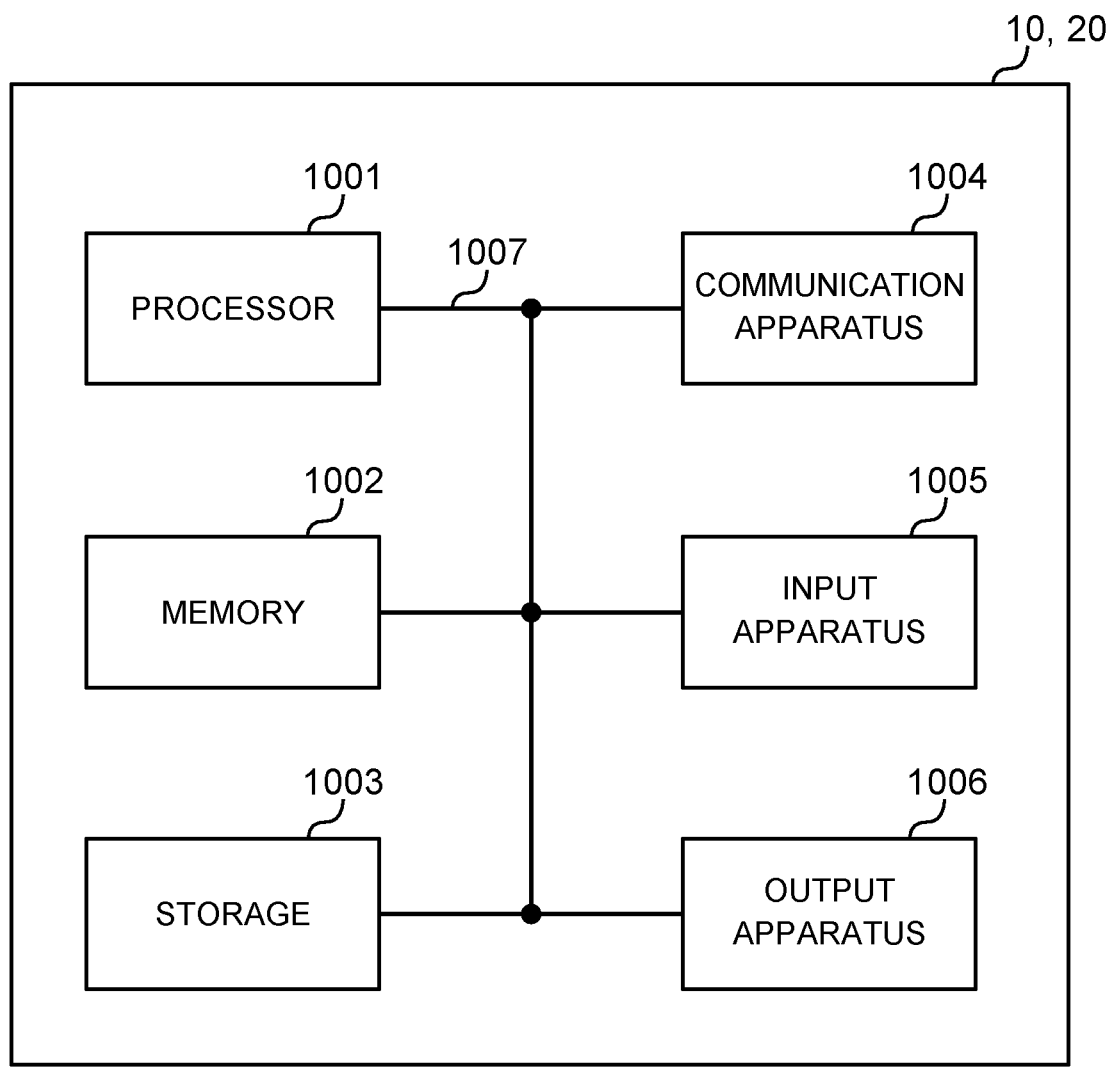
FIG. 13 is a diagram to show an example of a hardware structure of the radio base station and the user terminal according to one embodiment of the present invention.

For example, a radio base station, a user terminal, and so on according to one embodiment of the present disclosure may function as a computer that executes the processes of the radio communication method of the present disclosure. FIG. 13 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, when one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

Also, an RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "cell," a "sector," a "cell group," a "carrier," a "component carrier," "bandwidth part (BWP)," and so on can be used interchangeably. The base station may be referred to as the terms such as a "macro cell," a "small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

The radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A receiving apparatus comprising:
a receiving section that receives a data signal, a demodulation reference signal, and a specific signal in at least one of a plurality of layers; and
a control section that, based on the demodulation reference signal and the specific signal, estimates interference, controls transmission of a result of the estimation, and performs a modulo operation of the data signal.

2. The receiving apparatus according to claim 1, wherein
a dedicated layer in the plurality of layers is allocated to the receiving apparatus, and
the data signal in the dedicated layer and the specific signal in the dedicated layer are transmitted based on interference with the dedicated layer from a specific layer having a layer number smaller than a layer number of the dedicated layer.

3. The receiving apparatus according to claim 2, wherein the control section estimates interference to the dedicated layer from the specific layer, based on a signal received in a demodulation reference signal resource in the specific layer, a signal received in a demodulation reference signal resource in the dedicated layer, and a signal received in a specific signal resource in the dedicated layer.

4. The receiving apparatus according to claim 3, wherein the specific signal in each of the plurality of layers is transmitted by employing the modulo operation.

5. The receiving apparatus according to claim 3, wherein the plurality of layers are mapped to ports for the demodulation reference signals according to a certain order.

6. The receiving apparatus according to claim 2, wherein the specific signal in each of the plurality of layers is transmitted by employing the modulo operation.

7. The receiving apparatus according to claim 2, wherein the plurality of layers are mapped to ports for the demodulation reference signals according to a certain order.

8. The receiving apparatus according to claim 1, wherein the specific signal in each of the plurality of layers is transmitted by employing the modulo operation.

9. The receiving apparatus according to claim 8, wherein the plurality of layers are mapped to ports for the demodulation reference signals according to a certain order.

10. The receiving apparatus according to claim 1, wherein the plurality of layers are mapped to ports for the demodulation reference signals according to a certain order.

* * * * *